Patented June 22, 1943

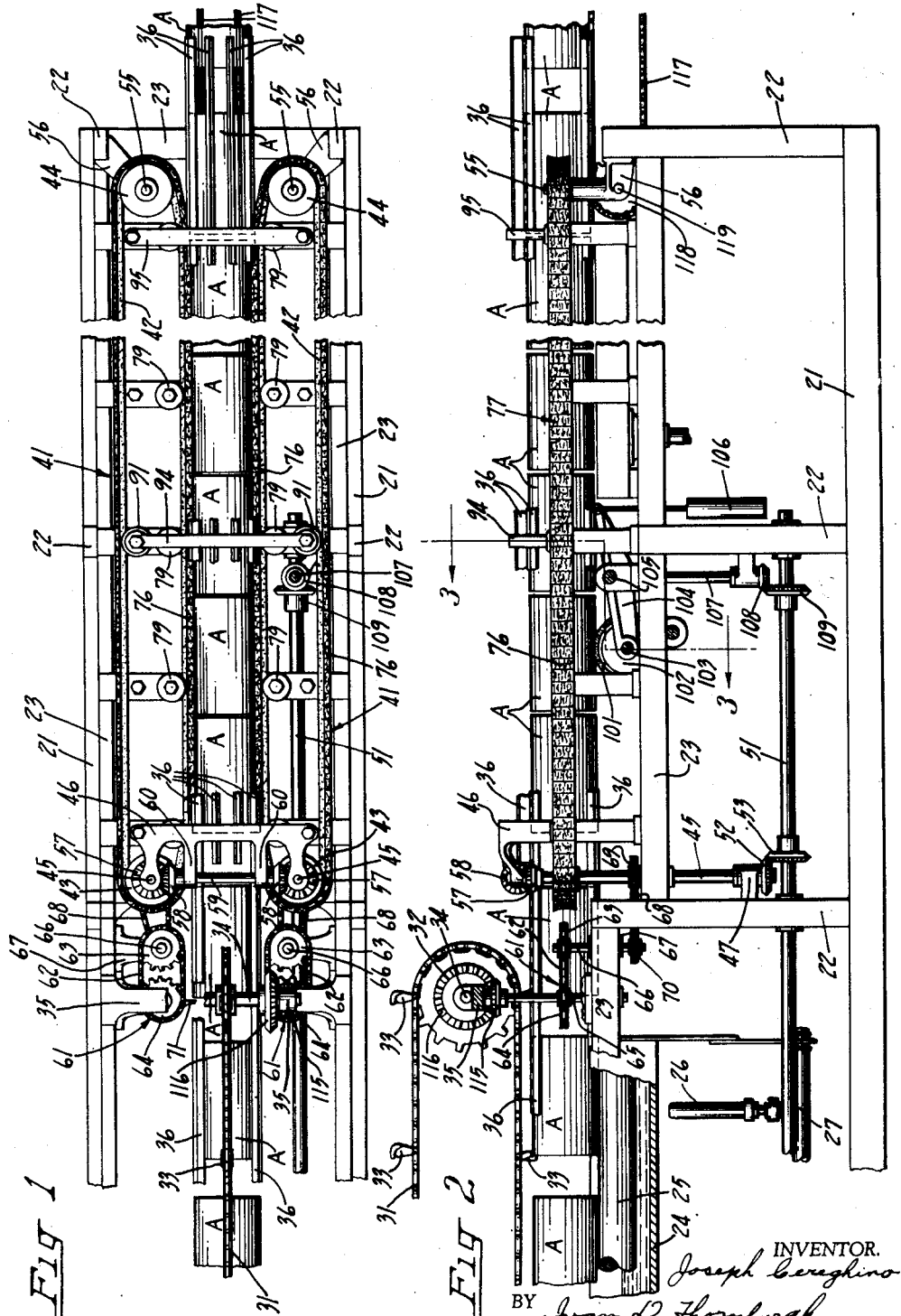

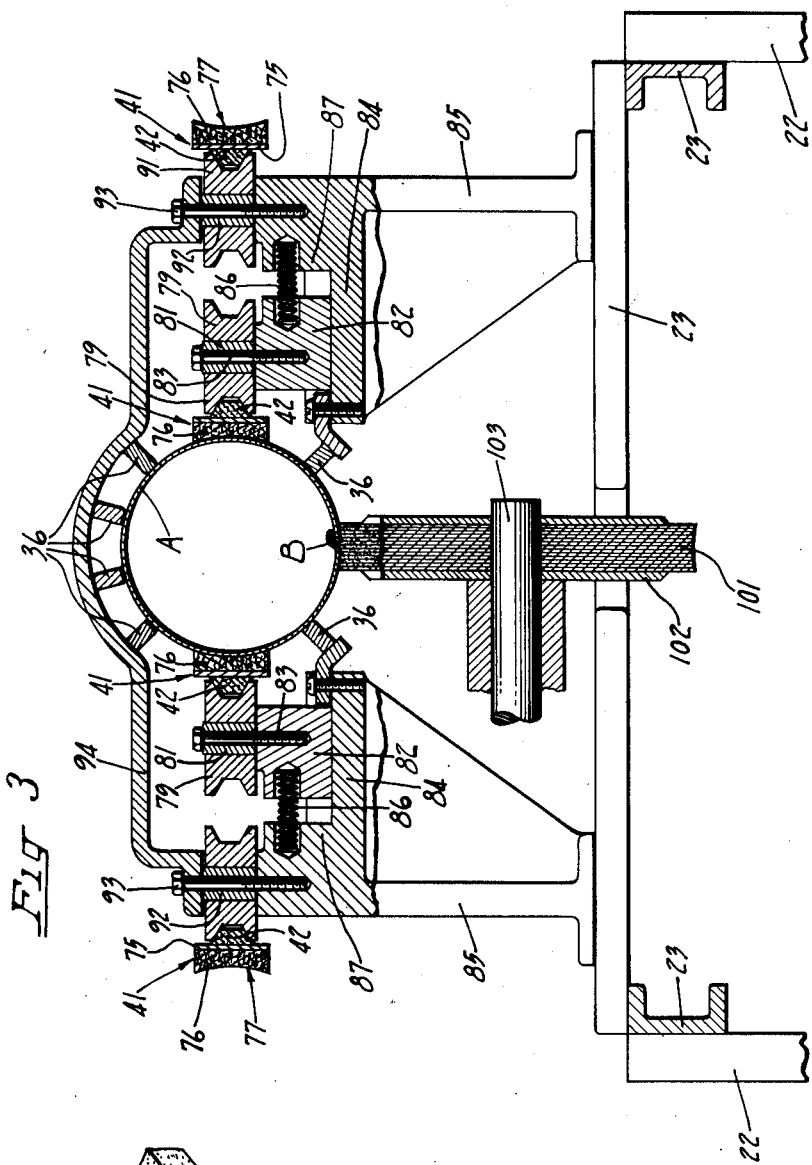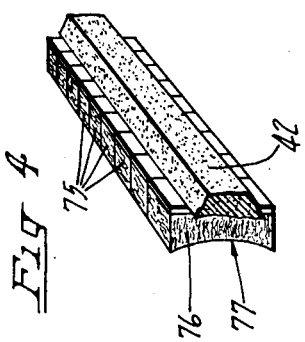

2,322,221

UNITED STATES PATENT OFFICE 2,322,221

SOLDERING MACHINE

Joseph Cereghino, Los Angeles, Calif., assignor to American Can Company, New York, N. Y., a corporation of New Jersey Application September 9, 1941, Serial No. 410,211

8 Claims. (Cl. 113—97)

The present invention relates to a can body side seam soldering machine and has particular reference to the handling of the freshly soldered can bodies as they are moved past the regular form of solder wiper by advancing the can bodies close together in their processional order so that solder which is being wiped off by the solder wiper will not be thrown into the can bodies as solder pellets or in any other form.

In the manufacture of soldered metallic can bodies from flat blanks the bodies are formed into the desired tubular shape and the side seams are soldered usually by passing the bodies in processional order over a solder roller. Immediately following and without stopping the body advancement the excess solder is removed usually by a rotating fabric wiper.

A conventional way of feeding the can bodies through the forming and soldering stations is by means of feed dogs carried on the feeding device and this necessitates a spacing of adjacent can bodies, while moving them in processional order, to accommodate the feed dogs. This spacing of adjacent bodies while passing the rotary wiper has often resulted in solder pellets being thrown inside of the can bodies. Many different ways have been tried for preventing this throwing of solder. Obviously, having solder on the inside of the can is very undesirable, especially if the cans are to be used for food products.

The present invention contemplates a simple solution for this problem by changing the spacing of can bodies after the solder has been applied to the side seam so that the procession of can bodies in passing the wiper practically presents no space between bodies through which solder can be thrown by the rapidly rotating wiper.

To accomplish such a desirable result while still not interfering with the usual can making procedure, a conveyor is used to pass the bodies through a wiper operation and to hold them sufficiently close in their processional spacing. Provision also has been made according to the present invention for easily bringing the can bodies into such closely spaced relation after the solder has been applied under usual operating conditions.

An object of the present invention is the provision of a soldering machine for soldering and wiping the side seams of metallic can bodies so that the solder is applied only in the seam and any excess solder wiped off is prevented from entering into the body by using the body itself as a barrier.

Another object of the invention is the provision in a can body soldering machine of a conveyor for advancing the can bodies through the solder applying station while spaced in the usual manner and a second conveyor for advancing the soldered bodies through the wiper station in close arrangement to block off any flying solder pellets from the wiper.

Yet another object is the provision of a respacing feed device in a machine of the character described by means of which the usual space between adjacent can bodies being conveyed past the solder wiper virtually is eliminated, thus preventing the throwing of solder into the inside of the soldered can.

Another object is the provision of a conveyor for a soldering machine which is formed with heat resisting asbestos blocks by means of which the can bodies are frictionally held without the use of feed dogs or feed fingers throughout the solder wiping operation.

Numerous other objects and advantages of the invention will be apparent as it is better understood from the following description, which, taken in connection with the accompanying drawings, discloses a preferred embodiment thereof.

Referring to the drawings:

Figure 1 is a plan view of a side seam soldering apparatus embodying the present invention and showing particularly the wiping section of the machine;

Fig. 2 is a side elevation of the same;

Fig. 3 is an enlarged vertical sectional view taken substantially along the broken line 3—3 in Fig. 2; and Fig. 4 is an enlarged perspective detail, partially in section, of one portion of the endless conveyor and showing individual asbestos blocks secured to a conveyor belt.

The drawings illustrate a usual form of can body side seam soldering device and have particular reference to a detailed disclosure of the exit end of the machine containing the solder wiping station. Such a machine may be supported upon a base 21 (Fig. 2) having upright frames 22 on which is carried a main frame 23. Only the end of the soldering applying station is shown, this being indicated by a solder bath 24 in which the usual form of solder applying roller 25 is mounted. The solder bath may be secured to the frame 23 in the conventional manner. A gas burner 26 is shown in Fig. 2 to suggest a heating of the solder bath. Such a burner may be mounted on a manifold gas supply pipe 27.

Can bodies A having the side seam already formed, are passed along a horizontal path of travel and in spaced relation so that the side seam (indicated by the letter B) is at the bottom. Thus it is in a position to move close to and almost in engagement with the rotating solder roll 26 as is usual in this type of soldering. During this advancement of the can bodies in their spaced relation molten solder is lifted as a film on the solder roll and is applied to the side seam in the conventional manner.

A conveyor chain 31 (Figs. 1 and 2) is formed for continuous movement in a vertical plane, such a chain passing over a sprocket 32 at the end of the solder bath 24. This chain carries the usual form of feed finger 33 by means of which the can body is gripped at its rear edge being held against turning while it is moved through the solder applying operation. The sprocket 32 is mounted upon a horizontal shaft 34 which is journaled in brackets 35 supported on the frame 23 of the machine. The shaft may be driven in any suitable manner so that the lower run of the conveyor chain 31 passes into can body gripping position to convey the can bodies over the solder roller 25. The driving connection will be discussed later.

During the solder applying operation and while the spaced can bodies A are being advanced over the solder roll, these bodies are guided in a straight line path of travel by upper and lower guide members 36 carried in suitable manner on the frame of the machine. These guide members may extend beyond the sprocket 32 and throughout both the solder applying and the solder wiping sections of the machine.

In the conventional machine the conveyor chain 31 extends throughout both the solder applying and the solder wiping stations and the advancing can bodies remain gripped by their feed fingers 33. In like manner the spaces between adjacent advancing bodies also remain the same throughout their course of travel. It is this space between can bodies that causes damage to the bodies in wiping. In this present disclosure, the chain 31 terminates at the end of the solder applying station and another conveyor receives the can bodies, after the space between adjacent bodies is closed, and further conveys them through the wiper station. Attention will now be given to this feature.

Two endless conveyors 41 (Figs. 1, 2 and 3) are employed for conveying the can bodies through the solder wiping section of the machine. Each conveyor consists of an endless belt 42 (see also Figs. 3 and 4) of rubber or other suitable material of the V-shaped type of belt. Such a belt is arranged on each side of the path of travel of the can bodies passing along the guide rails 36. Each endless belt moves in a horizontal plane and each passes over a drive sprocket 43 at the entrance end of the solder wiping section. Each belt also takes over an idler sprocket 44 located at the discharge end.

Each drive sprocket 43 (Figs. 1 and 2) is mounted upon a vertical shaft 45 which is journaled at the top in a bracket 46 carried on the frame 23. This bracket is of arch shape and extends across the path of travel of the can bodies. The bracket also provides a support for the guide rails 36. The lower end of each shaft 45 is journaled in a bearing 47 carried on one of the upright frames 22.

The forward vertical shaft 45 (Fig. 2) may be geared direct to a horizontal drive shaft 51 journaled in bearings formed in the frame 22. Bevel gears 52, 53 carried on their respective shafts 45 and 51 provide for this geared connection. Each sprocket 44 is mounted on a vertical shaft 55 which is journaled in a bracket 56 carried on the frame 22 of the machine.

The two shafts 45 are geared for corresponding rotation. For this purpose each shaft 45 adjacent its upper end carries a gear 57 (Figs. 1 and 2) which meshes with a gear 58 secured to each end of a horizontal shaft 59. Shaft 59 is journaled in bearings 60 formed on the bracket 46.

The two endless conveyors 41 thus are moved in unison so that the inside run of one conveyor advances at the same rate of travel as the inside run of the opposite conveyor. This assures a continuous advancement of the soldered can bodies A.

Prior to passing into the influence of the endless conveyors 41, however, the can bodies are spaced closer together by the action of a pair of transfer devices broadly indicated by the numeral 61 (Figs. 1 and 2). One of these transfer devices is arranged on each side of the path of travel of the can bodies and is located adjacent the sprocket 32 of the conveyor chain.

Each transfer device 61 comprises an endless chain 62 which is mounted to operate in a horizontal plane. For this purpose each chain passes over a drive sprocket 63 and a driven sprocket 64. Each sprocket 64 is mounted on a vertical shaft 65. Each drive sprocket 63 is mounted on a vertical shaft 66 which is journaled in a bracket 67 carried by the frame 23 of the machine. Each shaft 66 is driven from its adjacent vertical shaft 45 by means of a chain 68 which operates over a sprocket 69 carried by the shaft 45 and over a sprocket 70 carried by the shaft 66. In this way both of the transfer chains 62 move in unison on opposite sides of the passing can bodies A.

Each chain 62 carries a finger 71, the two fingers of the two chains being so arranged as to pass in the rear of and at the horizontal center of a can body A as it is released from the gripper finger 33 of the conveyor chain 31. This release takes place as the chain 31 passes up and over the sprocket 32.

The transfer chains 62 move at a faster rate of travel than the conveyor chain 31 so that the two fingers 71 advance at a slightly greater speed than the gripper finger 33 carried by the chain 31. This results in a picking up of the can body A which thereupon is pushed ahead so that during the time that the body is in the control of the transfer device 61 its rate of travel is accelerated. This distance is very short and the result of this advanced travel of a can body is to bring its forward edge very close to the rear edge of the can body just ahead. In other words, the space between the can bodies A is closed up or at least greatly reduced as desired so that the can bodies are close together when they come into the control of the endless conveyors 41 for passage through the solder wiping station.

The endless conveyor belt 42 of each conveyor 41 carries a series of support plates 75 (Figs. 3 and 4), these plates being arranged side by side and presenting a wall on the outside of the V-belt which is formed of narrow sections so as to readily pass around the pulleys. Asbestos blocks 76 are secured to the plates 75. Each block 76 is formed with an outer curved face 77. Such a face fits around the outside of a can body A as the latter is positioned in between oppositely disposed blocks 76 on the two belts 42. These blocks being formed of asbestos will not become unduly heated by the heated can bodies coming into the conveyors. The asbestos blocks also provide for frictional support of the can body by engaging on opposite sides at the center of the can body, as best illustrated in Fig. 3.

Provision is made for pressing these asbestos blocks against the opposite sides of the can body as it is being conveyed through the can wiping station. At several places intermediate the sprockets 43 and 44 of the two belt conveyors 42, supplemental pulleys 79 are provided for engaging inside of the inner run of each conveyor belt 42.

Each pulley 79 is grooved to properly seat the V-belt as it passes along the pulley. Each pulley is mounted to turn on a sleeve stem 81 which is clamped to, and which is mounted on a sliding block 82 by a bolt 83. Each sliding block 82 is mounted on a grooved shelf 84 formed in a bracket 85 which is mounted upon the frame 23. There is such a bracket on each side of the machine.

Each block 82 is urged inwardly by a spring 86 which is interposed between the block and a solid projection 87 formed in the bracket 85. This spring tends to press in on the block and with it the pulley 79 so that the asbestos blocks 76 of the belt 42, which are engaging with the pulley at the time are yieldably pressed against the can body. The described yieldable can engagement by the conveyors is provided for the inside run of each conveyor 41. In order to maintain the conveyors 41 in a straight line along the outside part of the belt other pulleys 91 of a non-yielding character are provided. Each pulley 91 is mounted to turn freely on a sleeve 92 which is carried on top of the projection 87 of the bracket 85. It is anchored by means of a bolt 93.

Approximately in the center of the machine a pulley 91 is located on each side. Thus there is provided in transverse line extending across the machine, two aligned yielding pulleys 79 and two outside pulleys 91. This serves two purposes, first it maintains both runs of the conveyor belts 42 straight between their pulleys 43, 44 and secondly, it provides for the desired yieldable frictional holding of the can bodies in their close arrangement while passing the solder wiper.

This central set of pulleys 79, 91 (Fig. 3) is tied together by a bracket frame 94 which is held down on the two outer sleeves 92 by the bolts 93. This bracket 94 adjacent its center carries the guide bars 36 as shown and is located at the solder wiping station. A modified type of bracket 95 (Figs. 1 and 2) may be used in a similar manner at the end of the machine to help tie the parts together and to provide for the desired support of the guide bars 36.

The solder wiper comprises a series of fabric discs 101 held between disc plates 102 which are mounted on a horizontal shaft 103 (Figs. 2 and 3). The shaft 103 may be mounted on a pair of support levers 104 which are pivoted at 105 to the frame 23. A weight 106 secured to one of the lever arms 104, tends to raise the wiper disc 101 into yielding engagement with the can bodies as the same are conveyed along the guide rails 36.

The wiper may be rotated in a suitable manner. A connecting shaft 107, which is shown in Fig. 2, is geared to one of the drive shafts 51 by means of gears 108, 109 mounted on the respective shafts 107, 51. This is a conventional form of wiper mechanism and further detail disclosure is thought unnecessary.

The chain conveyor 31 also may be geared directly for operation from the drive shaft. The two vertical shafts 65 of the transfer devices 61 are journaled at the bottom in the frame 23 and at the top in the brackets 35. The forward shaft 65 at the top may carry a gear 115 which meshes with a gear 116 mounted on the sprocket shaft 34. This insures synchronism between the advancing soldered bodies A and the transfer devices 61.

The soldered and wiped can bodies A as they travel between the belt pulleys 44 pass onto the upper run of a pair of discharge conveyor chains 117 which may be operated in any suitable manner. Such chains at the machine end pass over sprocket 118 mounted on a shaft 119 journaled in the brackets 56.

Such a chain discharge may be operated at a faster speed of travel than the travel of the conveyor belts 42 where this is desirable. The increased travel again spaces adjacent can bodies so that they may be passed through other operations in the regular manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for soldering side seams of can bodies, comprising a solder applying device for applying molten solder to the seam, a solder wiper for removing excess solder from said seam, a guide member for directing the can bodies past said solder device and past said wiper, feeding devices for moving the said bodies in spaced relation along said guide member, and means disposed adjacent said solder applying and wiping means for decreasing the spacing between said bodies as they are moved past said wiper, to prevent wiped solder from gaining access to the interior surfaces of said can bodies.

2. A machine for soldering side seams of can bodies, comprising a solder applying device for applying molten solder to the seam, a solder wiper for removing excess solder from said seam before it solidifies, a guide member for directing the can bodies past said solder device and past said wiper, feeding devices for moving the said bodies in spaced relation along said guide member, and means disposed between said solder applying and wiping means for engaging and accelerating the speed of travel of the soldered can bodies to materially decrease the spacing therebetween as the bodies are moved past said solder wiper, whereby to shield the can interiors and prevent throwing of solder inside of a moving can body.

3. A machine for soldering side seams of can bodies, comprising a solder roller for applying molten solder to the seam, a rotary disc wiper for removing excess solder from said seam before it solidifies, a guide member for directing the can bodies past said solder roller and past said wiper, feeding devices for moving the said bodies in spaced relation along said guide member and past said roller and wiper at a uniform rate of travel, and conveyor means disposed between said solder roller and wiper and operating at a speed in excess of the speed of said feeding devices adjacent said roller, said conveyor means engaging and accelerating the speed of travel of the can bodies between said solder applying roller and said wiper so that the bodies are brought into materially closer spaced relation during their passage along said wiper to prevent throwing of solder inside of a moving can body.

4. A machine for soldering side seams of can bodies, comprising a solder applying device for applying molten solder to the seam, a solder wiper for removing excess solder from said seam, a guide member for directing the can bodies past said solder device and past said wiper, a conveyor chain for advancing can bodies in relatively widely spaced processional order along said guide member while passing said solder roller, an endless conveyor for advancing the soldered can bodies in closely spaced processional order along said guide member while passing said wiper to prevent throwing of solder inside of the moving can body, and transfer instrumentalities for engaging and removing the spaced can bodies from said conveyor chain while accelerating their speed of travel to bring the can bodies into said closely spaced order while placing them into engagement with said endless conveyor.

5. A machine for soldering side seams of can bodies, comprising a solder applying device for applying molten solder to the seam, a solder wiper disposed adjacent said applying device for removing excess solder from said seam before it solidifies, a guide member for directing the can bodies past said solder device and past said wiper, a conveyor chain for advancing can bodies in spaced processional order along said guide member while passing said solder applying device, feed fingers carried by said chain for engaging the can bodies to hold them in relatively widely spaced relation, a pair of endless conveyors for further advancing the soldered can bodies along said guide member, said conveyors including frictional blocks for frictionally holding the can bodies therebetween and in closely spaced processional order while passing said wiper, such closely spaced order shielding said bodies and preventing throwing of solder by said wiper into the interiors of the moving can bodies, and transfer instrumentalities disposed between said solder applying device and said wiper for engaging and removing the relatively widely spaced can bodies from the feed fingers of said chain conveyor and for accelerating the speed of travel of the bodies to bring the can bodies into said closely spaced order while placing them between said conveyor blocks.

6. A machine for soldering side seams of can bodies, comprising a solder applying roller for applying molten solder to the seam, a rotary disc wiper disposed adjacent said roller for removing excess solder from said seam before it solidifies, a guide member for maintaining the can bodies in a straight line of travel past said solder roller and said wiper, a conveyor chain for advancing can bodies in relatively widely spaced processional order along said guide member while passing said solder roller, an endless conveyor for advancing the soldered can bodies in relatively closely spaced processional order along said guide member while passing said wiper, said endless conveyor including a plurality of asbestos blocks for frictionally engaging against diametrically opposed outer surfaces of said can bodies, yielding devices engaging said endless conveyor for pressing said blocks into frictional contact with the can bodies to prevent slippage thereof, transfer instrumentalities disposed between said solder applying roller and said wiper for successively engaging and removing the widely spaced can bodies from said chain conveyor and for accelerating the speed of travel thereof to bring the can bodies into said closely spaced processional order while placing them between said blocks of said endless conveyor to shield the body interiors so that solder will not be thrown by said wiper into between adjacent can bodies and thence into the interior thereof, and a discharge chain for successively engaging and removing the wiped can bodies from said endless conveyor and for again relatively spacing the bodies for further advancement.

7. In a machine for soldering side seams of can bodies, the combination of a solder applying means and a solder wiping means spaced therefrom, each of said applying and wiping means having separate conveyor means for advancing can bodies in spaced relation relative thereto, and moving means disposed between said applying and wiping means for successively engaging the soldered can bodies on said solder applying conveyor means to transfer the can bodies into engagement with said solder wiping conveyor means while accelerating the speed of travel of the can bodies to materially decrease the spacing therebetween while being advanced relative to said wiping means, whereby to shield the can body interiors from solder thrown off by said wiping means.

8. In a machine for soldering side seams of can bodies, the combination of a solder applying roller and a solder wiping device spaced therefrom, said roller and wiping device each having a separate conveyor for advancing can bodies in spaced relation relative thereto, and a rotating transfer device disposed between said solder roller and wiping device for successively engaging the can bodies on said solder applying conveyor to transfer the soldered can bodies into engagement with said solder wiping conveyor, said transfer device rotating at a faster speed of movement than said solder applying conveyor to momentarily accelerate the speed of travel of the can bodies so as to materially decrease the spacing therebetween while being advanced by said wiping conveyor relative to said wiping device, whereby to shield the can body interiors from solder thrown off by said wiping device.

JOSEPH CEREGHINO.